(12) United States Patent
Hermary et al.

(10) Patent No.: US 6,924,746 B2
(45) Date of Patent: Aug. 2, 2005

(54) DEVICE AND METHOD TO ESTABLISH TEMPORAL CORRESPONDENCE IN MULTIPLE SENSOR CONFIGURATIONS

(76) Inventors: Terrance John Hermary, 3287 Pinehurst Place, Coquitlam, BC, V3E 3K3 (CA); Alexander Thomas Hermary, 8944 Harrie Road, Surrey, BC V4N 4B8 (CA)

( * ) Notice: Subject to any disclaimer, the term of this patent is extended or adjusted under 35 U.S.C. 154(b) by 339 days.

(21) Appl. No.: 10/349,642

(22) Filed: Jan. 22, 2003

(65) Prior Publication Data

US 2003/0179104 A1 Sep. 25, 2003

Related U.S. Application Data

(63) Continuation of application No. 09/634,504, filed on Aug. 9, 2000, now abandoned.

(51) Int. Cl.[7] .............................................. G08C 19/06
(52) U.S. Cl. ............................. 340/870.06; 340/870.11; 710/51; 710/61; 700/11; 700/108
(58) Field of Search ...................... 340/870.11, 870.05, 340/870.06; 702/179, 89; 710/61, 51; 700/4, 114, 108; 370/439

(56) References Cited

U.S. PATENT DOCUMENTS

| | | | | |
|---|---|---|---|---|
| 3,573,444 A | * | 4/1971 | Kawabata et al. | 702/38 |
| 3,676,846 A | * | 7/1972 | Busch | 714/749 |
| 3,691,755 A | * | 9/1972 | Girard | 368/29 |
| 3,742,148 A | * | 6/1973 | Ladeen et al. | 370/439 |
| 3,828,325 A | * | 8/1974 | Stafford et al. | 710/63 |
| 3,828,331 A | * | 8/1974 | Brooks | 340/870.06 |
| 3,924,077 A | * | 12/1975 | Blakeslee | 370/433 |
| 5,301,275 A | * | 4/1994 | Vanbuskirk et al. | 710/48 |
| 5,469,545 A | * | 11/1995 | Vanbuskirk et al. | 709/234 |
| 5,515,490 A | * | 5/1996 | Buchanan et al. | 715/500.1 |
| 5,671,008 A | * | 9/1997 | Linn | 348/97 |
| 6,098,031 A | * | 8/2000 | Svetkoff et al. | 702/159 |
| 6,123,510 A | * | 9/2000 | Greer et al. | 417/53 |
| 6,292,108 B1 | * | 9/2001 | Straser et al. | 340/870.11 |

* cited by examiner

*Primary Examiner*—Albert K. Wong
(74) *Attorney, Agent, or Firm*—Robert H. Barrigar

(57) ABSTRACT

A sensor concentrating system centralizes communication between multiple parameter sensing devices and an application host. As a peripheral device, the sensor concentrating unit establishes a temporal correspondence between range data acquired from multiple optical range sensors with position data acquired from a shaft encoder. The parameter data are read and sampled according to a user specified criteria such as the time division multiplexing technique. The sampled data is correlated with a data tag generated by the sensor concentrating unit. The correlated data is packeted transmitted from the sensor concentrating unit to a downstream application host for subsequent analysis. The sensor concentrating unit also provides operating parameters for individual parameter sensing devices.

7 Claims, 19 Drawing Sheets

Multi Drop Communications configuration
- All nodes (Sensors) share one response channel

Star Network Communications configuration
- Each node (Sensor) has a dedicated response channel

Preferred Process Sensor Network configuration
- Each node (Sensor) has a dedicated response channel
- Encoders are connected to Sensor Concentrating Unit
- Sensor data available for more than one Host Application Block Diagram of Preferred Sensor Concentrating Unit Implementation

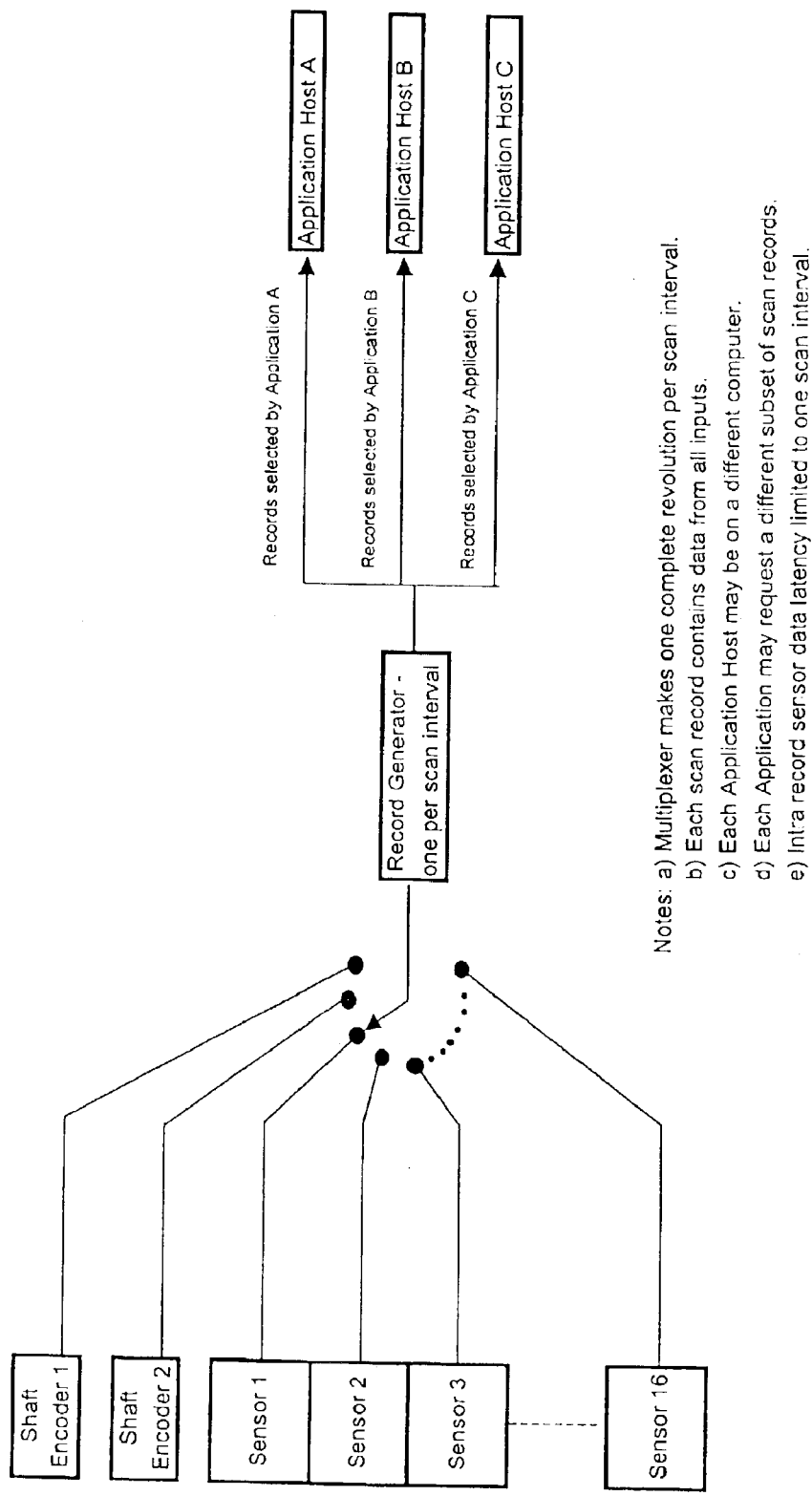

| Scan Record counter | Shaft Encoder 1 binary counter | Shaft Encoder 2 binary counter | Sensor 1 Range reading | Sensor 2 Range reading | Sensor 3 Range reading | Sensor 4 Range reading | Sensor 5 Range reading | Sensor 6 Range reading | Sensor 7 Range reading | Sensor 8 Range reading | Sensor 9 Range reading | Sensor 10 Range reading | Sensor 11 Range reading | Sensor 12 Range reading | Sensor 13 Range reading | Sensor 14 Range reading | Sensor 15 Range reading | Sensor 16 Range reading |
|---|---|---|---|---|---|---|---|---|---|---|---|---|---|---|---|---|---|---|
| 14893 | ffffff | ffffff | 5369 | 5099 | 29750 | 5871 | 6429 | 5962 | 6157 | 6464 | 5502 | 6113 | 6230 | 5776 | 6011 | 6445 | 5975 | 6312 |
| 14894 | ffffff | ffffff | 5369 | 5099 | 29756 | 5871 | 6429 | 5962 | 6157 | 6464 | 5502 | 6113 | 6230 | 5776 | 6011 | 6445 | 5975 | 6312 |
| 14895 | ffffff | ffffff | 5370 | 5108 | 29753 | 5871 | 6429 | 5962 | 6157 | 6464 | 5502 | 6113 | 6231 | 5777 | 6011 | 6445 | 5975 | 6312 |
| 14896 | ffffff | ffffff | 5370 | 5108 | 29757 | 5871 | 6429 | 5962 | 6157 | 6464 | 5502 | 6113 | 6230 | 5776 | 6011 | 6445 | 5975 | 6312 |
| 14897 | ffffff | ffffff | 5369 | 5099 | 29757 | 5871 | 6429 | 5962 | 6157 | 6464 | 5502 | 6113 | 6230 | 5777 | 6011 | 6445 | 5975 | 6312 |
| 14898 | ffffff | ffffff | 5369 | 5108 | 29759 | 5871 | 6429 | 5962 | 6157 | 6464 | 5502 | 6113 | 6230 | 5776 | 6011 | 6445 | 5975 | 6312 |
| 14899 | ffffff | ffffff | 5369 | 5108 | 29763 | 5871 | 6429 | 5962 | 6157 | 6464 | 5502 | 6113 | 6230 | 5776 | 6011 | 6445 | 5975 | 6312 |
| 14900 | ffffff | ffffff | 5370 | 5108 | 29766 | 5871 | 6429 | 5962 | 6157 | 6464 | 5502 | 6113 | 6230 | 5776 | 6011 | 6445 | 5975 | 6312 |
| 14901 | ffffff | ffffff | 5369 | 5108 | 29770 | 5871 | 6429 | 5962 | 6158 | 6464 | 5502 | 6113 | 6231 | 5776 | 6011 | 6445 | 5975 | 6312 |
| 14902 | ffffff | ffffff | 5369 | 5099 | 29770 | 5871 | 6429 | 5962 | 6157 | 6464 | 5502 | 6113 | 6231 | 5776 | 6011 | 6445 | 5975 | 6312 |
| 14903 | ffffff | ffffff | 5369 | 5108 | 29770 | 5871 | 6429 | 5962 | 6157 | 6464 | 5502 | 6113 | 6230 | 5776 | 6011 | 6445 | 5975 | 6312 |

Incremented once per scan interval

Incremented or decremented based on encoder Quadrature inputs

Range reading from sensor

Figure 6

Sample Scan Interval records

DEVICE AND METHOD TO ESTABLISH TEMPORAL CORRESPONDENCE IN MULTIPLE SENSOR CONFIGURATIONS

CROSS-REFERENCE TO RELATED APPLICATIONS

This application is a continuation to U.S. patent application Ser. No. 09/634,504, filed Aug. 9, 2000, now abandoned, entitled DEVICE AND METHOD TO ESTABLISH TEMPORAL CORRESPONDENCE IN MULTIPLE SENSOR CONFIGURATIONS, which application is incorporated herein by specific reference.

BACKGROUND OF THE INVENTION

1. The Field of the Invention

This invention relates to the field of data association, correlation and routing in industrial processes.

2. The Relevant Technology

In automated industrial processes and systems, one often encounters situations in which it is necessary to establish a temporal correspondence between data received from several different data sources. In one such type of system, it is necessary to make an accurate association between parameter data and position data. So, for example, in a production-line context, it may be important for ongoing control of the production process to know precisely where on the line a workpiece was when a given parameter, say workpiece length, was measured.

There have been several techniques previously developed for associating and establishing a temporal correspondence between different types of data. For any data correlation to be possible, each type of data to be correlated with other data must include not only parameter identification and measurement values, but also address or associative information that enables a correlator or comparator (typically a microprocessor) to identify the two or more data items that are to be correlated. Preferably the correlator should establish a linked data association that, as a correlated data record, can be utilized elsewhere in the production process.

However, earlier techniques for associating position data with parameter data have encountered problems with the system architecture and have furthermore often not been determinative; that is, these techniques do not provide certainty that one type of parameter data is correctly grouped with a second type of parameter data.

In one previously known type of system, the input/output data interfaces of a series of parameter-sensing devices accepting electronic data inputs and providing electronic data outputs are bussed together linearly. In telecommunication nomenclature, this is referred to as a multidrop configuration. Generally, a multidrop configuration has a communication host (such as a sensor polling unit) which sequentially requests readings from each node on the network. At one end of this bus, a sensor polling unit is connected for transmitting data to and receiving instructions from each parameter-sensing device. The sensor polling unit is coupled to and user-operable by means of a host computer. In such a system, a position-sensing device is not connected to the sensor polling unit. Instead, the position-sensing device is connected to the host computer by means of a separate connection.

The foregoing technique suffers from two problems. Because the parameter-sensing devices are strung together on a single bus, the sensor polling unit can transmit data to and receive data only from a single parameter-sensing device at any given time. Specifically, since all nodes share the same response channel only one node can respond at a time. The time to turn around a request/response transaction is limited by the response channel bandwidth, specifically the response message (sensor reading) and overhead, back to the host. Channel bandwidth is a function of a number of factors, including physical distance between sensor and data poller. Furthermore, the host systems architecture is often not optimized to allow full utilization of the bandwidth. Response messages received from the sensor are normally signalled to the processor via an interrupt which may not be serviced until such time as other higher priority tasks have completed. During this time, the communications channel can be idle.

That means the multidrop technique tends to be too slow for the speeds and degrees of accuracy needed in many industrial processes, since more than one sensing device may be competing for data input or output, and by the time a given device has access to the sensor polling unit, the workpiece (say) may have moved downstream in the production line (say) by a distance that renders the data no longer sufficiently accurate or meaningful to be correlated from a workpiece position viewpoint with subsequent processing steps required to be made on the workpiece. Furthermore, if even a single parameter-sensing device is not functioning properly, the entire system can falter and the operator must check each node along the line to determine the source of the problem.

The second problem associated with the foregoing technique is that since the position data are acquired by the host computer by means of a connection separate from that for parameter data, the association of the two types of parameter data performed by the host computer is non-determinative—in other words, the operator cannot be sure whether parameter data measured during some interval of time or at some point or region of space is accurately correlated with position data purportedly relating to that particular interval of time or region of space. Since position data and parameter data are transmitted to the host computer by means of two separate connections, if position data is improperly synchronized with data received from a parameter-sensing device via the sensor polling unit, the position data may be imperfectly correlated with parameter data. The system may be tolerant of minor discrepancies between parameter data and supposedly associated second type of parameter data, but as production line speeds increase and as tolerances become more critical, such discrepancies are less tolerable and can cause production of out-of-specification rejects, or other serious problems.

Another type of previously known system used for data association uses an architecture that busses together parameter-sensing devices by means of a star network; each parameter-sensing device has a direct connection to the sensor polling unit. In this way, if a single parameter-sensing device is not operating correctly, the sensor polling unit need not be prevented from communicating with the remainder of the nodes on the network, and the entire system need not falter in the event of failure of a sensing device.

Nevertheless, this set-up is still less than ideal. In the star network, sensor data from multiple sensing devices are transmitted to a single sensor polling unit which, after grouping or otherwise assembling data, is used to transmit these data over an Ethernet connection to a host computer; however, position data is transmitted to the host computer by means of a separate connection. As before in the multidrop configuration, this system does not address correlation problems; there may still exist an imperfect association between parameter data and the two types of parameter data. If the data signal received from the sensor polling unit cannot reliably be correlated with a particular interval of time or region of space, then the received signal may be seriously corrupted or even useless to the purpose at hand.

A satisfactory solution for associating two or more types of parameter data is not found in known techniques. A satisfactory device to associate and correlate data, especially parameter data with position data should:

(a) establish a temporal correspondence between the two types of parameter data;

(b) be very fast, such that the temporal correspondence is sufficiently precise as to be useful as an input to downstream process control or monitoring device in the production line (say) or other industrial process;

(c) be adaptable to different types of parameter-sensing devices.

The aforementioned desirable characteristics of a sensor concentrating unit not currently met by the known art may be realized by directing both types of parameter data first to the sensor concentrating unit, at which point the sensor concentrating unit correlates given one type of parameter data with a second type of parameter data. The two types of parameter data can be coupled using an accompanying data tag identifying the associated data. The associated data and data tag can then be packeted and routed to the microprocessor or PC for subsequent processing, or else sent directly downstream to a process controller.

SUMMARY OF THE INVENTION

Generally, this invention relates to an apparatus and method for associating or correlating two different types of data in complex systems involving multiple (at least two) parameters, interrogators and downloads of data for use in monitoring or controlling an industrial process. More precisely, the preferred embodiment of the invention describes a device and technique used for establishing a determinative association between parameter data and position data, for correlating such data with a data tag or equivalent identifier, and for packeting and routing data to an application host.

In the present invention, a sensor concentrating unit is used to centralize communication between parameter sensing devices, and a computation facility of some sort, typically a host computer. The sensor concentrating unit includes the following elements:

1. multiple parameter sensing device interfaces
2. processing electronics
3. a memory
4. an application host interface These elements are generally associated as follows: at least two different series of parameter data provided by multiple parameter sensing devices are acquired by the sensor concentrating unit through the parameter sensing device interfaces; relying on an algorithm stored in the memory, the processing electronics associate parameter data from at least two different series of parameter data; associated data is then transmitted to an application host or to other sensor concentrating units or data hubs or the like by means of the application host interface.

According to the preferred embodiment of the invention, one type of parameter data is provided by multiple shaft encoders. These shaft encoders acquire data relating to the position of an object placed on an production line. Another type of parameter data is supplied by multiple optical range sensors. If these two sources of data are accurately grouped in temporal correspondence, such a system may be used in determining the surface profile of a moving object to within a calculable resolution.

Specifically, in the foregoing exemplification, optical range sensors are arranged in a straight line across the movement (line-of-travel) axis of a production line to measure depth to the surface of the production line conveyor belt or equivalent. Each range sensor is fixed in a particular location, say along an x-axis generally parallel to and coextensive with the production line. A shaft encoder provides the relative linear position of an object (e.g., a plank or board) placed on that production line, say along a y-axis.

As the object passes the sensors, different sensors detect the leading edge of the object at different times, and each range sensor generates a surface profile of the object as it passes by; that is, each range sensor provides a stream of range data. Each range sensor measures distance to the surface of the object along multiple cross-sections of the object as it passes the sensor, the distance being measured, say along a z-axis.

If range sensor data accurately establish a temporal correspondence with position data of that object, a discrete model of the contour or profile of the surface of the object (at least along one dimension) may be determined using x, y, and z-axis data. In this way, any irregularity or warping of the contour of an object (such contour being, for example, the near edge of a plank of wood as it passes the range sensor) may be accurately determined.

In accordance with one aspect of the present invention, there is provided a sensor concentrating unit for associating parameter value data from two or more parameter sensing devices.

The apparatus includes at least two parameter sensing devices which provide a series of discrete sensor output data for the sensor concentrating unit; each parameter sensing device provides a separate series of parameter value data relating to measurements made by the parameter sensing device.

In the preferred embodiment of the present invention the sensor concentrating unit associates position data acquired from a shaft encoder with range data acquired from multiple optical range sensors. Both optical range sensors and shaft encoders (along with related data processing electronics) generate a series of parameter value measurements and generate a corresponding series of electronically readable parameter value data.

The multiple series of parameter value data are transmitted from the parameter sensing devices to the sensor concentrating unit and are received by the sensor concentrating unit through multiple parameter sensing device interfaces.

According to the preferred embodiment of the invention, a parameter sensing device transmits a series of digital parameter data to the sensor concentrating unit by means of cable wire using RS422 signalling. Each parameter sensing device is connected to the sensor concentrating unit by means of plug in terminal strip connectors included in the sensor concentrating unit; that is, each sensing device is connected to a separate physical interface. Each specific physical interface has associated, a unique, predetermined data field in the response record. Said interfaces allow for both transmitting instructions to the sensing devices and for receiving data from the sensing devices.

Furthermore, because a shaft encoder provides a quadrature signal indirectly related to the linear position of a moving object, the sensor concentrating unit also includes a logic device used for converting the quadrature signal into a signal indicative of relative linear position. A logic device comprises a suitable arrangement of logic gates.

The apparatus for the present invention further includes means for reading the series of parameter value data received from the parameter sensing devices, includes sampling means to read a selected set of parameter value data from each series of discrete parameter value data according to a specified criteria and includes processing means for associating selected sets of parameter value data from at least two parameter sensing devices and for generating a data tag indicative of at least one selected characteristic of the associated data.

In the preferred embodiment of the invention, each of the foregoing elements of the sensor concentrating system are integrated within the circuitry of the sensor concentrating unit.

Specifically, a microprocessor broadcasts a request to parameter sensing devices for sensor output data. Sensor output data for each sensing device are received by dedicated UART's, which have the ability to buffer the compact response message. Within a predetermined interval, the processor sequentially reads each UART and begins to assemble a response record in RAM. Alternatively a UART may be substituted for an analog-to-digital converter or another generic input device. Also, during the scan interval, the encoder counters are read and appended to the response record. Finally, a response record sequence number is appended to the response record and the complete record will be available for one or more application host system(s) which request it. A separate processing sequence checks to see if any application host(s) are requesting the current record and if so, the record is copied to the required outgoing packet buffer(s) in RAM. Outgoing packets are formatted into TCP/IP packets by the processor, said packets including a device or node type identifier in the header. The packet is forwarded to the Ethernet transport device once the requested packet size is reached.

The sensor concentrating unit includes routing means to transmit data to at least one downstream process control device acting in response to correlated data routed thereto.

According to the preferred embodiment of the invention, the downstream host application is a computer which may perform averaging, addition, subtraction, threshold comparison, alarm generation and other functions which are meaningful for the application and be used to display the results of the data and for subsequent analysis. The connection from the sensor concentrating unit to the application host is made via an Ethernet interface running TCP/IP.

In accordance with another aspect of the present invention is a method for establishing a determinative association between at least two different sets of parameter data and utilizing such associated data in the control of apparatus for implementing an industrial process.

According to an embodiment of the invention, the operator of the system may advantageously implement the invention indirectly by means of an application host connected to a sensor concentrating unit. On a production line or the like, the sensor concentrating unit under the user-specified directions of the application host, repeatedly samples and establishes a temporal correspondence with two or more types of parameter data. Via the application host, the operator of the system can both transmit instructions to the sensor concentrating unit and receive parameter value data, or various system performance data from the sensor concentrating unit. For example, over a Telnet session, the operator of the system may both query the sensor concentrating unit for various performance data, as well as configure various settings of the sensor concentrating unit.

Furthermore, the operator may also provide operating parameters for any particular sensing device connected to the sensor concentrating unit. These instructions may be transmitted from the application host to the sensor concentrating unit and routed by the sensor concentrating unit to the particular sensing device. Alternatively, operating parameters for any particular sensing device may be stored in the non-volatile memory of the sensor concentrating unit. These instructions may be transmitted to any sensing device which is connected to a particular sensing device interface. Because any sensing devices may be connected to any sensing device interface, and because operating parameters are automatically transmitted by the sensor concentrating unit to a sensing device by means of a particular sensing device interface, any sensing device may be readily interchangeable with any other. The sensor concentrating unit has the ability to detect and report to the host, different types of compatible sensing devices which are connected at each sensor interface.

The method includes receiving at least two different series of parameter data, each series of parameter data consisting of a discrete parameter value data.

When an operator wishes to receive associated data, the operator transmits reading session instructions to the sensor concentrating unit, first to begin the reading in a specified manner, and then to separate the reading of each data packet from the reading of other data packets. Such reading session instructions may, for example, specify the number of readings requested for a given reading session, the number of data samples to acquire from a sensing device for any given reading, and the time interval between readings.

The next steps of the method includes sampling a selected set of sensor output data from each of the series of parameter data according to at least one specified criterion and associating each of a selected set of sensor output data with a separate and corresponding selected set of sensor output data, thereby to generate a combined parameter data packet representing the combination of at least two selected sets of sensor output data.

The user specified criterion is a set of instructions which direct the sensor concentrating unit to sample parameter value data from certain series of parameter value data at particular times. For example, according to the preferred embodiment of the invention, parameter data is associated with position data by means of a time division multiplexing technique; that is, data samples are acquired from position and parameter data streams by assigning each stream a different time slot within a given time interval. An alternative to the time division multiplexing technique may be implemented using a suitable parallel in/serial out shift register logic device.

The next step includes generating a data tag indicative of a characteristic of the sampled data and appending it to the data packet and routing selected tagged data packets to selected destinations in response to operator-selected instructions.

According to an embodiment of the invention, after sampling parameter data according to specified sampling criteria and reading session instructions, the sensor concentrating unit correlates the associated data with a data tag that accompanies the sensor data for the measured parameter. The data tag is used to help the operator identify and process data received from the sensor concentrating unit. The data tag is automatically generated by the sensor concentrating unit and may be related to the clock-time, the reading number, the reading session number, or some other quantity defined according to the needs of the operator.

Parameter data, position data and correlated data tag are next packeted and routed to the application host by previously known TCP/IP protocol standards. Such data, received by the application host, may be presented to the operator and used in subsequent analysis.

One key advantage of the present invention is that the sensor concentrating unit effectively separates the steps of gathering parameter data from the steps of processing parameter data performed by a downstream application host; as a peripheral device, the sensor concentrating unit contributes to the overall system by accurately establishing a temporal correspondence with sensor data to a predetermined limit. The invention may be readily integrated into many different types of systems to provide certainty of accurate temporal correspondence (within system limitations) between any two or more series of parameter data.

Furthermore, correlated parameter data is transmitted from the sensor concentrating unit to the application host as digital data signals. Digital signals, unlike analog signals, are not limited to travelling short distances nor are they subject to distortion from background electrical noise often prevalent in an industrial process.

Another advantage of the present invention includes sensor interfaces which enable the hot plugging of parameter sensing devices.

BRIEF DESCRIPTION OF THE DRAWINGS

FIG. 5 is a block diagram demonstrating the methodology for establishing a temporal correspondence between at least two types of parameter data.

FIG. 6 is sample of a series of records generated for an application host.

FIG. 7 are schematics of the sensor concentrating unit.

FIG. 7a depicts the upper left quadrant of the complete schematic; FIG. 7b depicts the upper right quadrant of the complete schematic; FIG. 7c depicts the lower left quadrant of the complete schematic; and FIG. 7d depicts the lower right quadrant of the complete schematic.

FIG. 8a depicts the upper left quadrant of the complete schematic; FIG. 8b depicts the upper right quadrant of the complete schematic; FIG. 8c depicts the lower left quadrant of the complete schematic; and FIG. 8d depicts the lower right quadrant of the complete schematic.

FIG. 9a depicts the upper left portion of the complete schematic; FIG. 9b depicts the upper right portion of the complete schematic; FIG. 9c depicts the lower left portion of the complete schematic; FIG. 9d depicts the lower middle portion of the complete schematic; and FIG. 9e depicts the lower right portion of the complete schematic.

DETAILED DESCRIPTION OF THE PREFERRED EMBODIMENTS

Introduction

Figure 1:
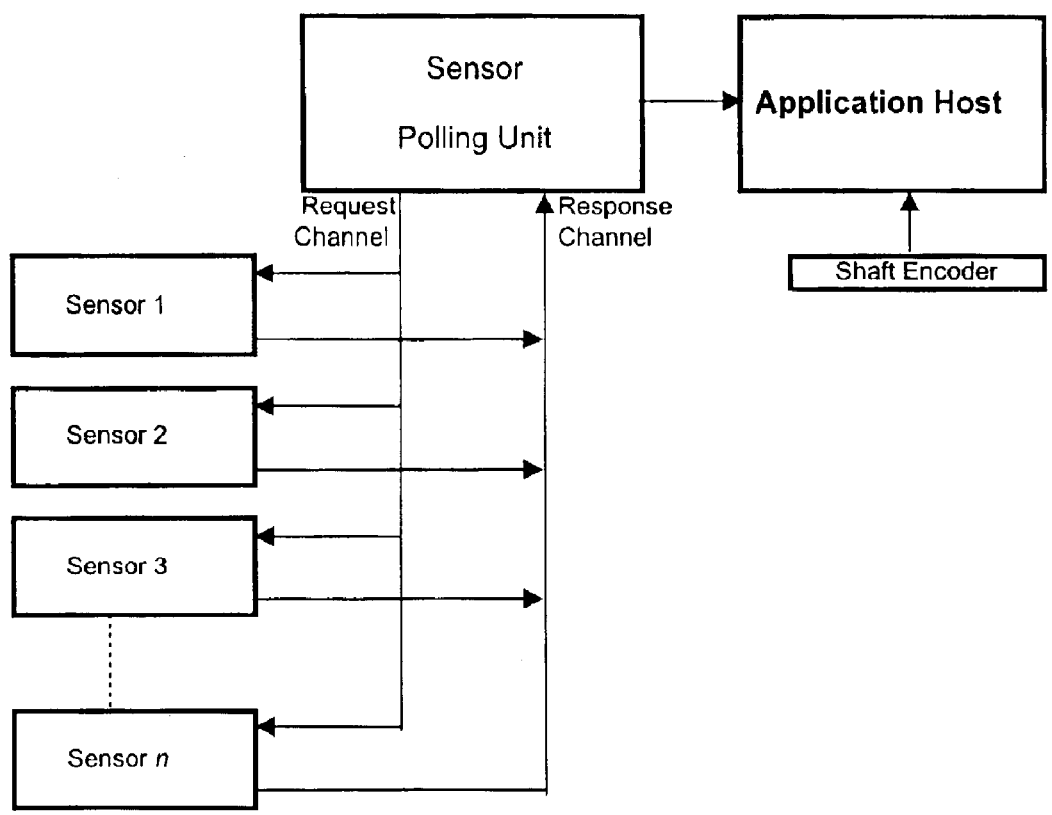
FIG. 1 is a diagram of the multidrop network configuration.
Figure 2:
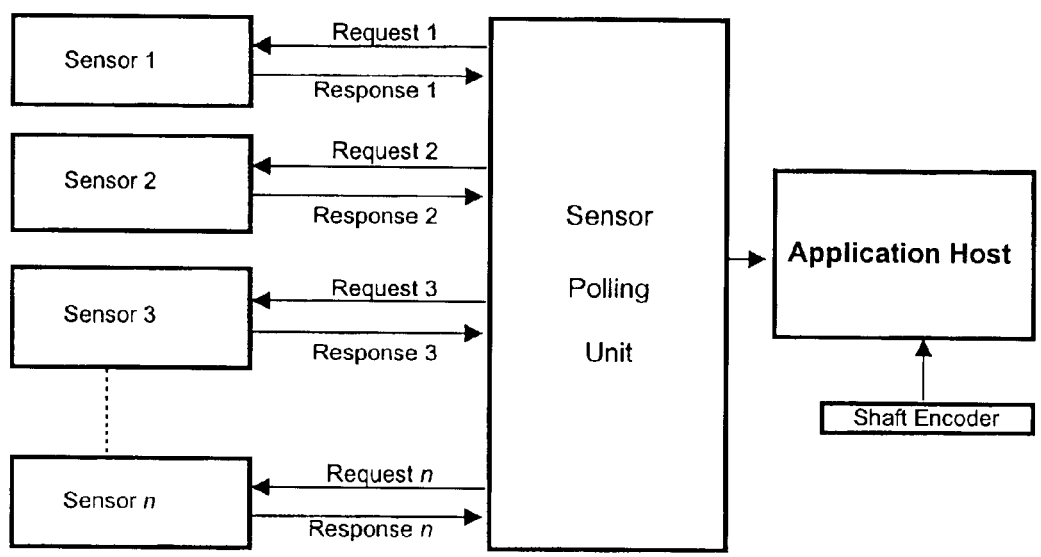
FIG. 2 is a diagram of the star network configuration.
Figure 3:
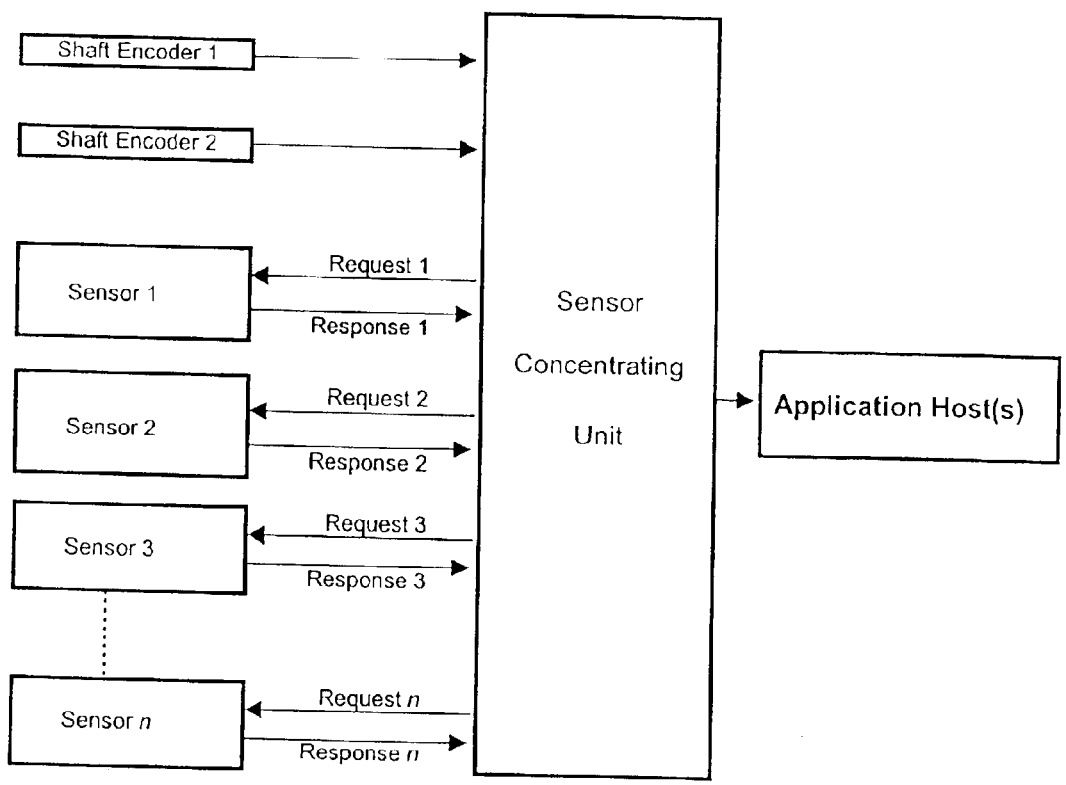
FIG. 3 is a diagram of the preferred embodiment network configuration showing both range sensors and shaft encoders being routed to the sensor concentrating unit.
Figure 4:
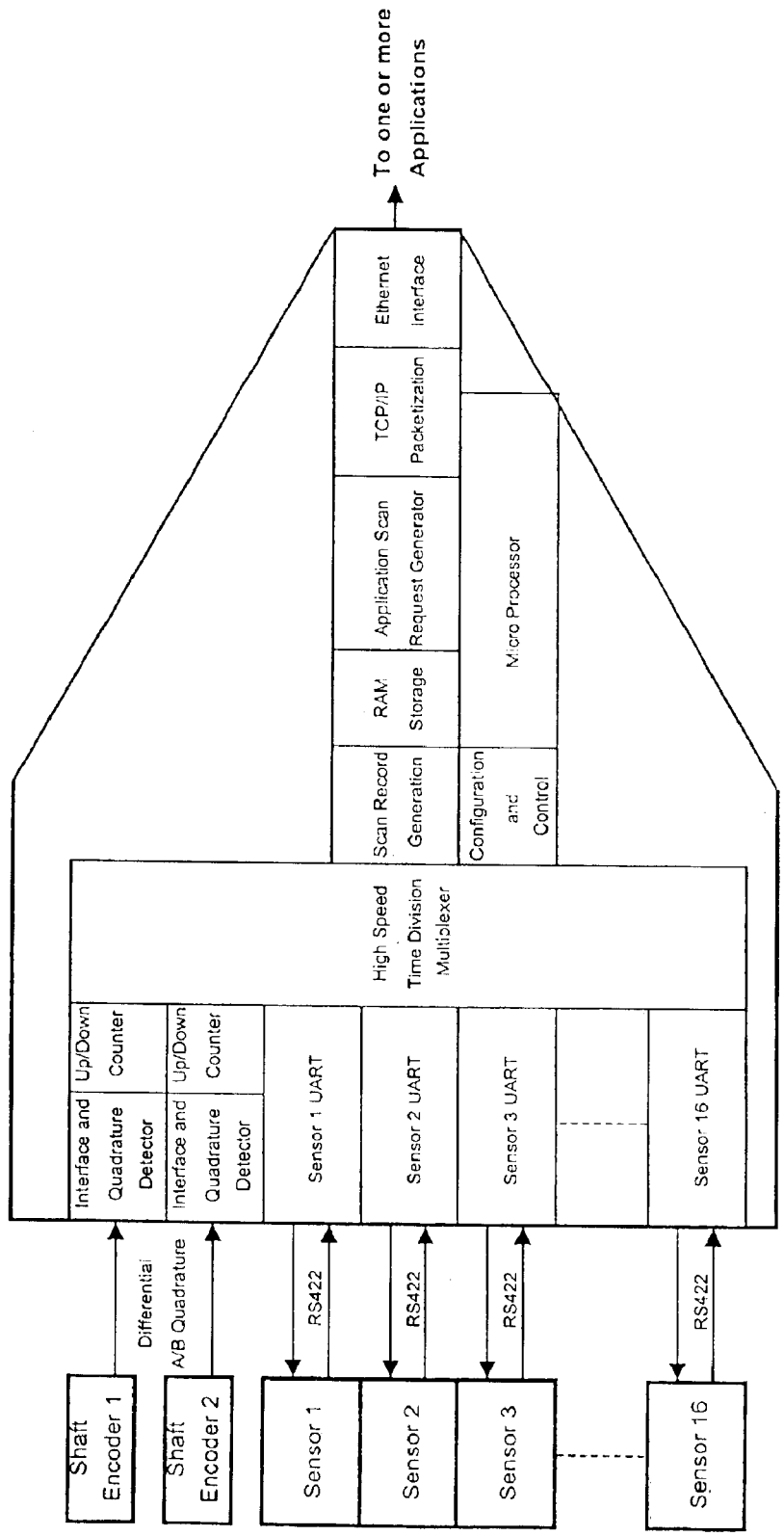
FIG. 4 is a block diagram demonstrating the implementation of the sensor concentrating unit.
Figure 7A:
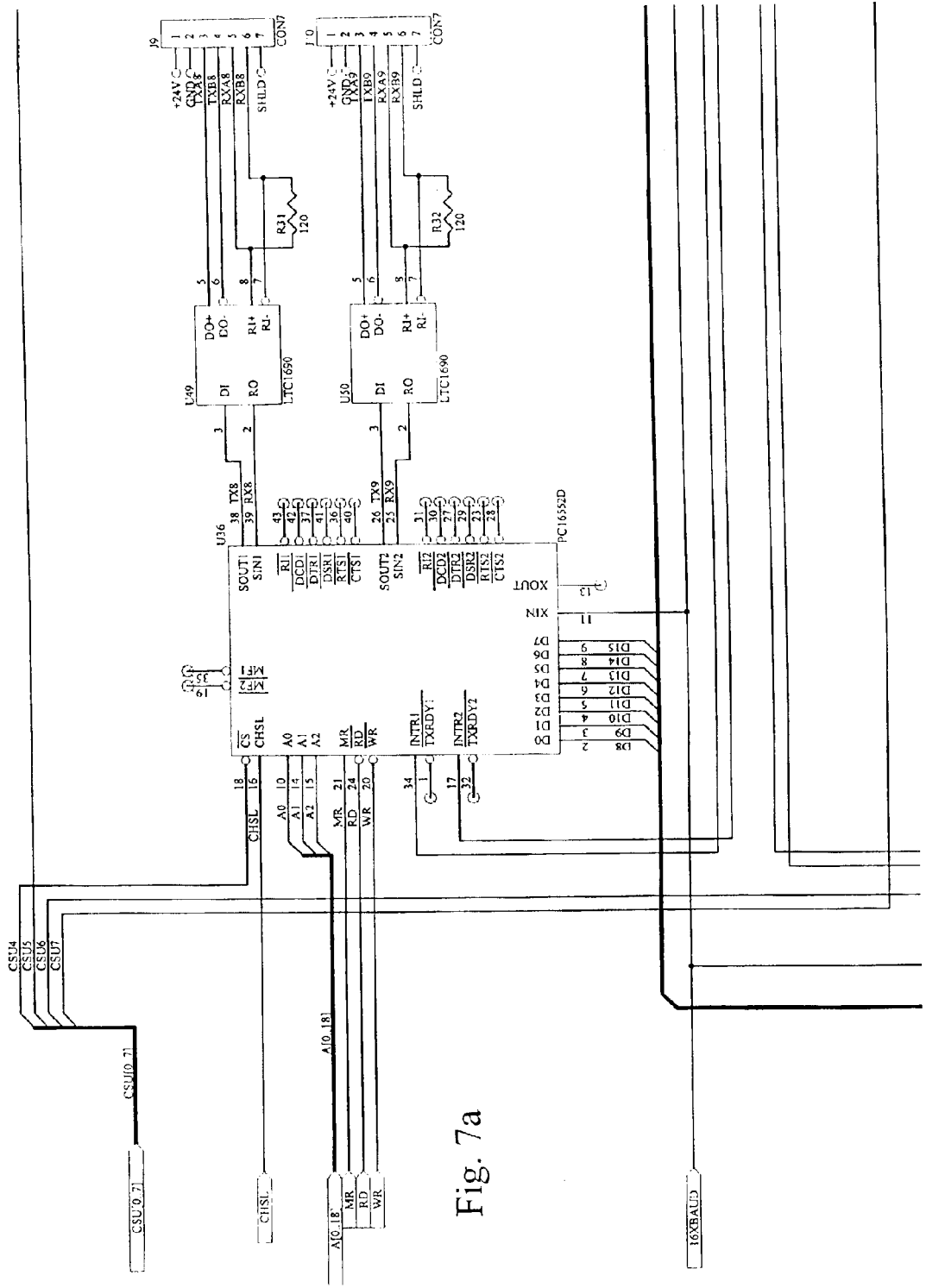
FIGS. 7a, 7b, 7c, and 7d taken together form a composite schematic of a sensor concentrating unit circuit that can be used in the practice of this invention.
Figure 7B:
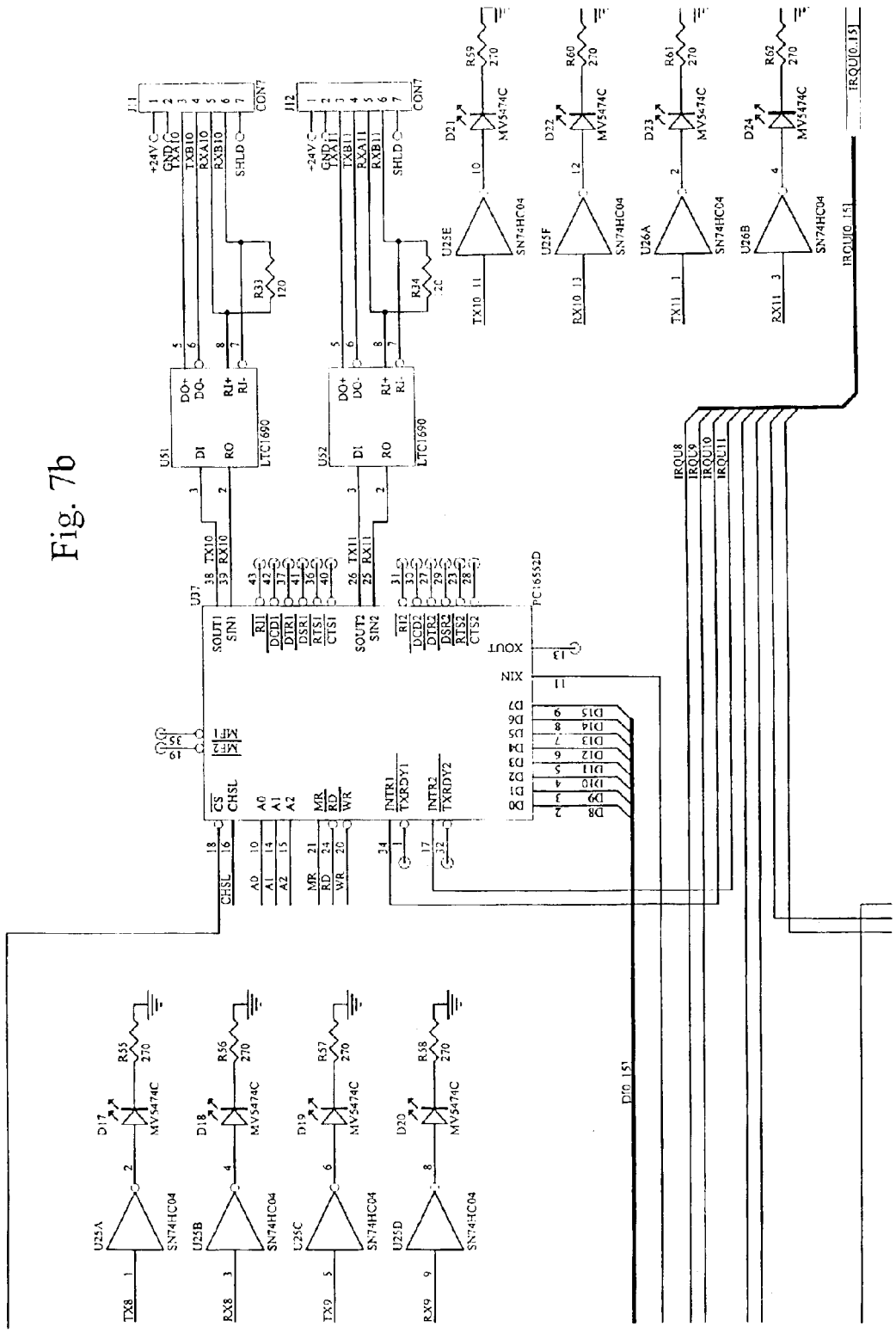
Figure 7C:
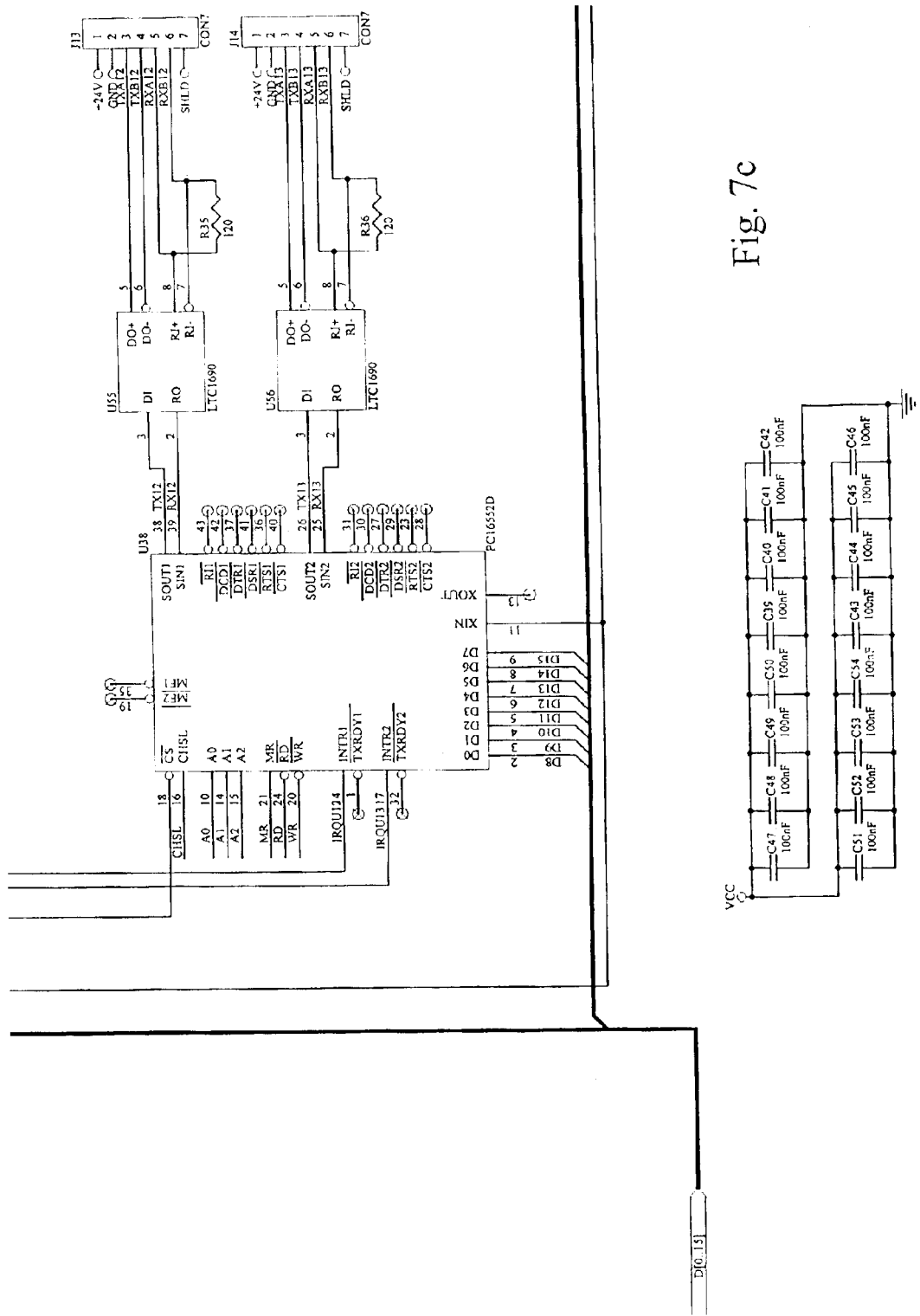
Figure 7D:
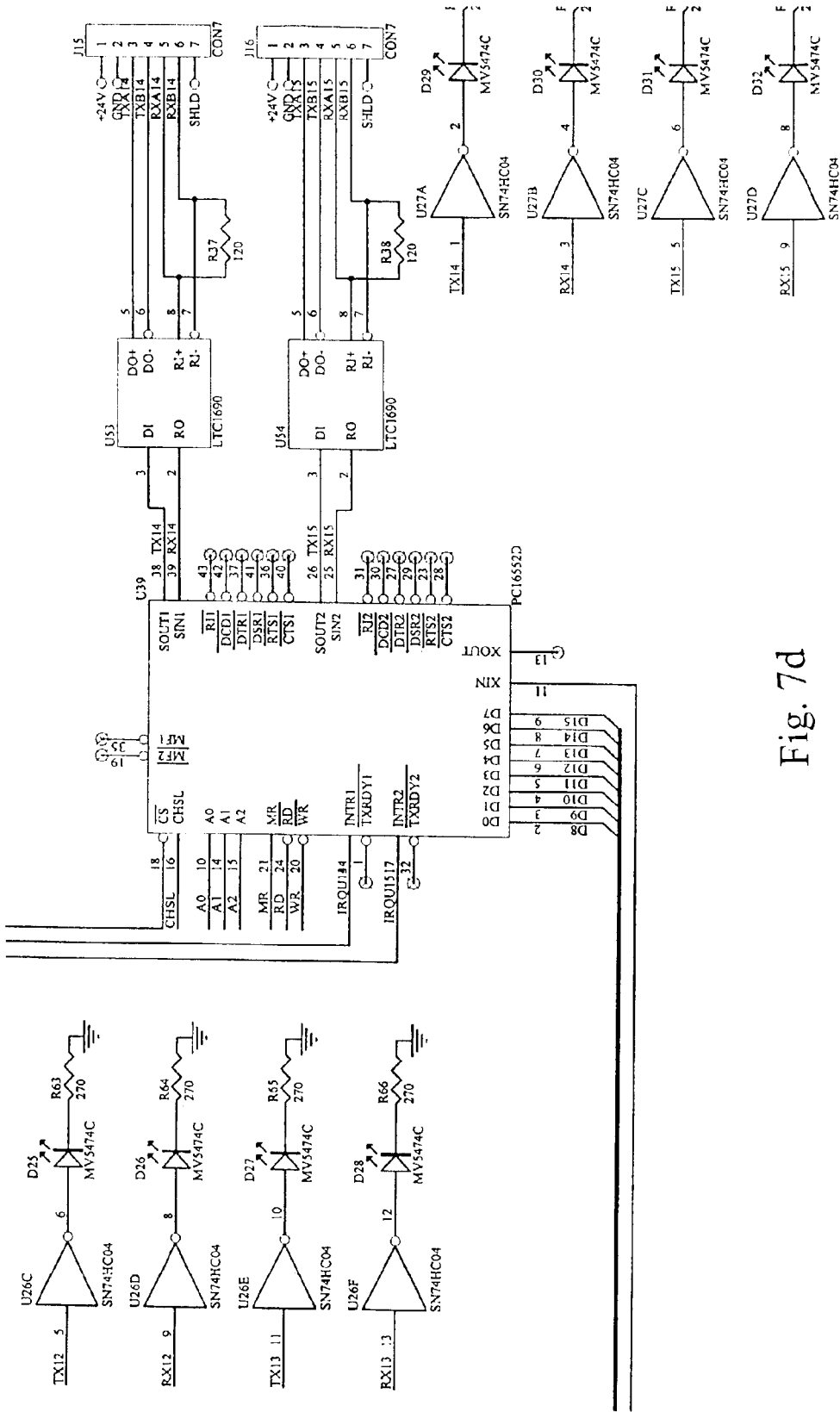
Figure 8A:
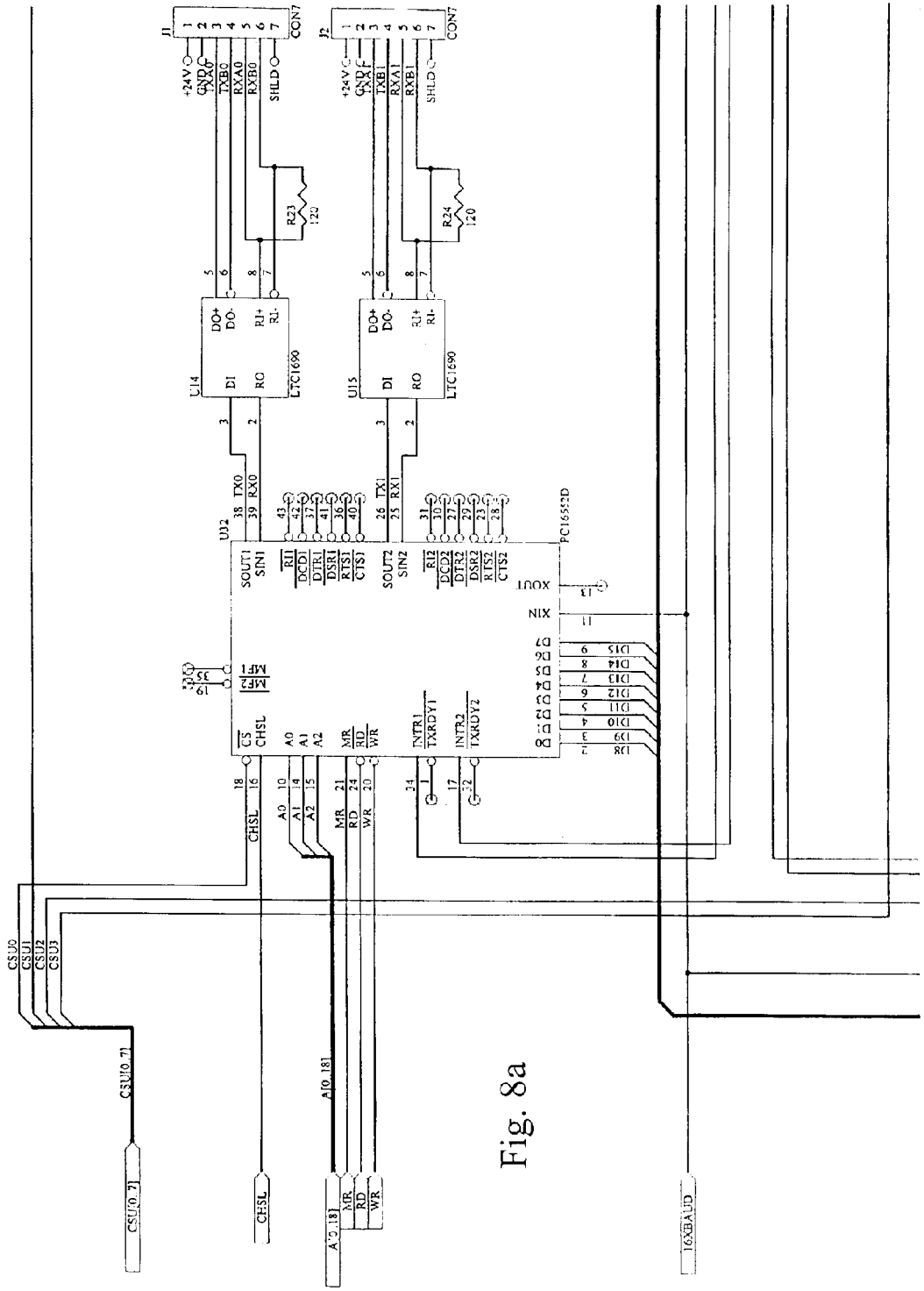
FIGS. 8a, 8b, 8c, and 8d taken together form a composite schematic of a sensor concentrating unit circuit that can be used in the practice of this invention.
Figure 8B:
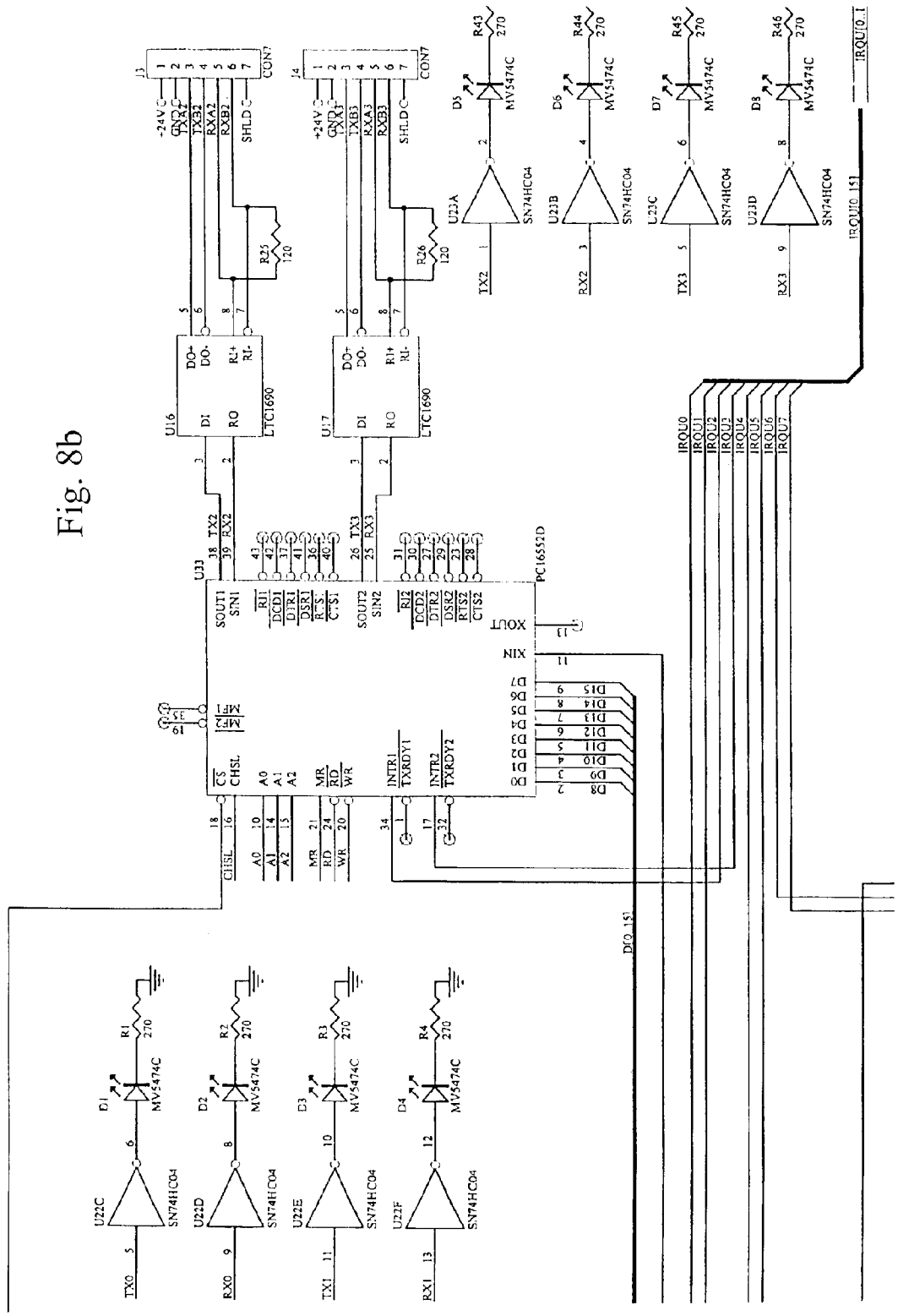
Figure 8C:
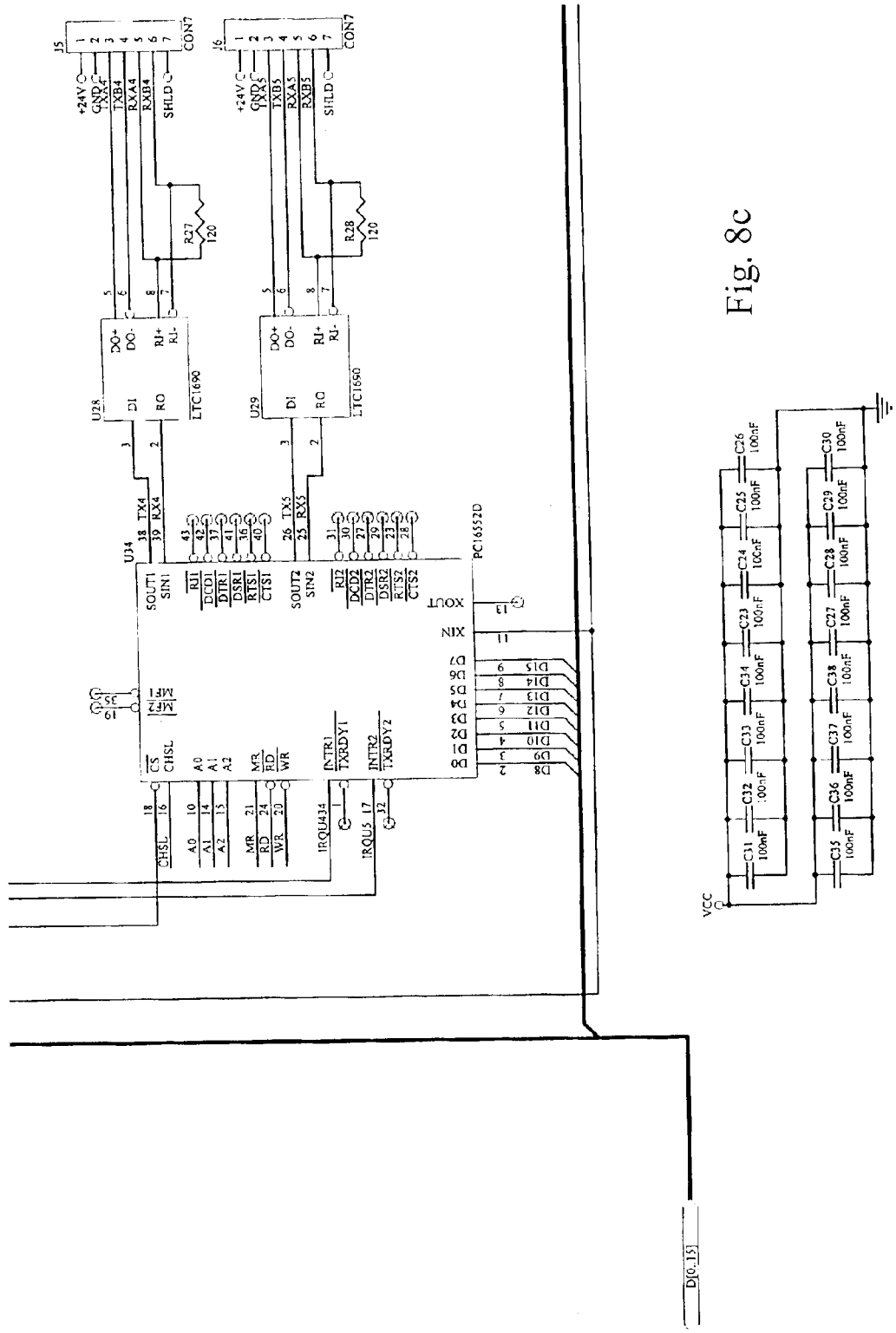
Figure 8D:
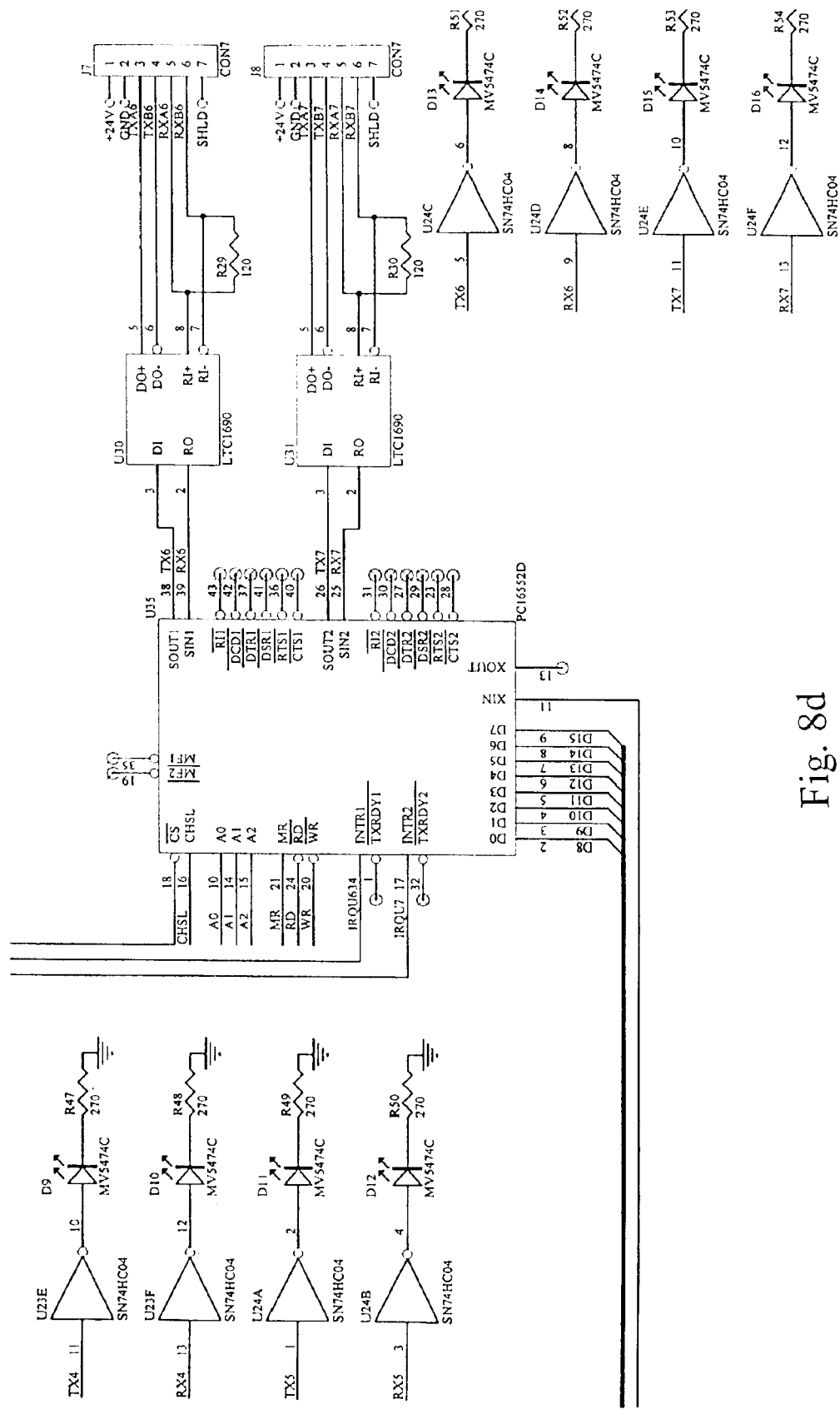
Figure 9A:
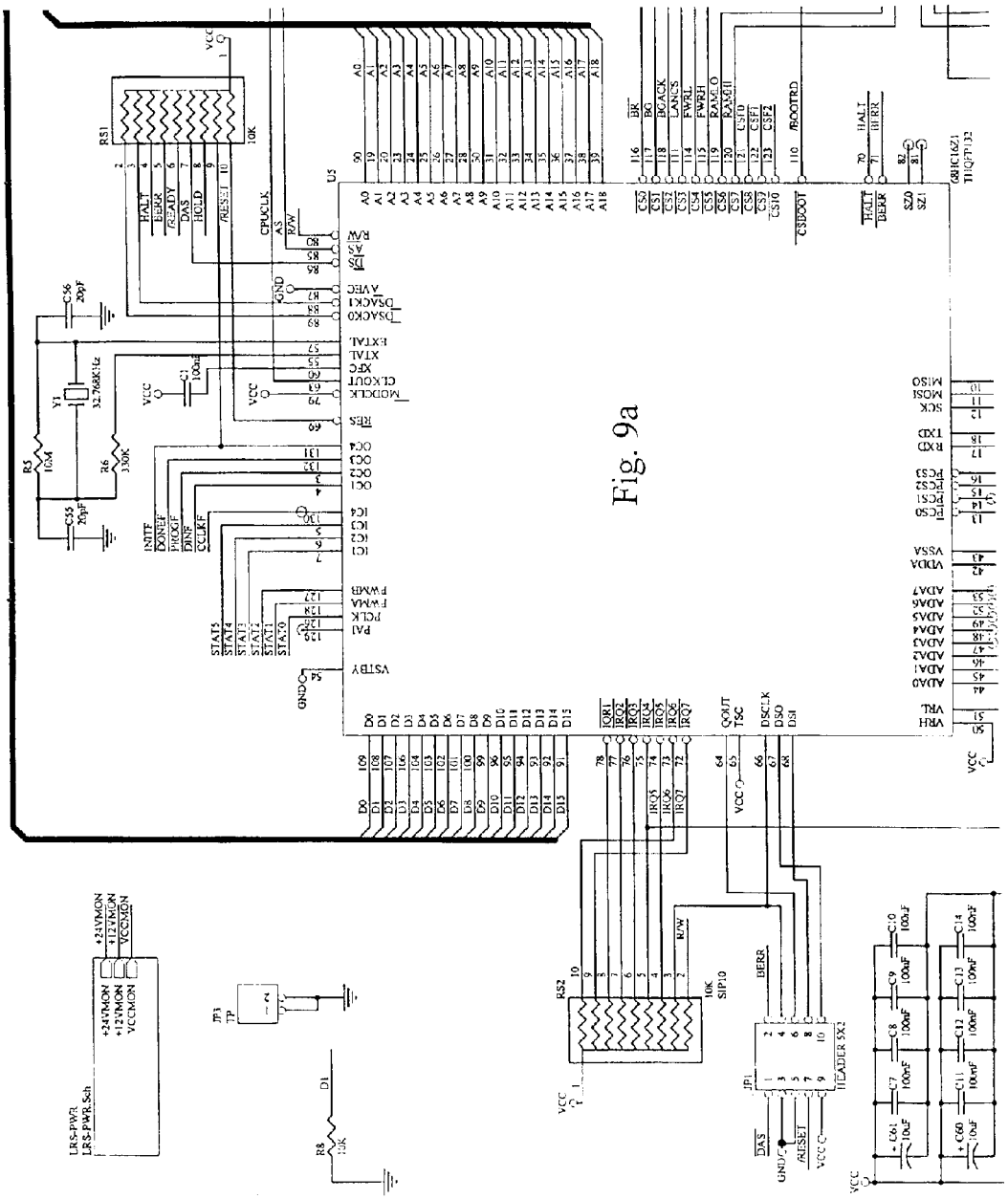
FIGS. 9a, 9b, 9c, 9d, and 9e taken together form a composite schematic of a sensor concentrating unit circuit that can be used in the practice of this invention.
Figure 9B:
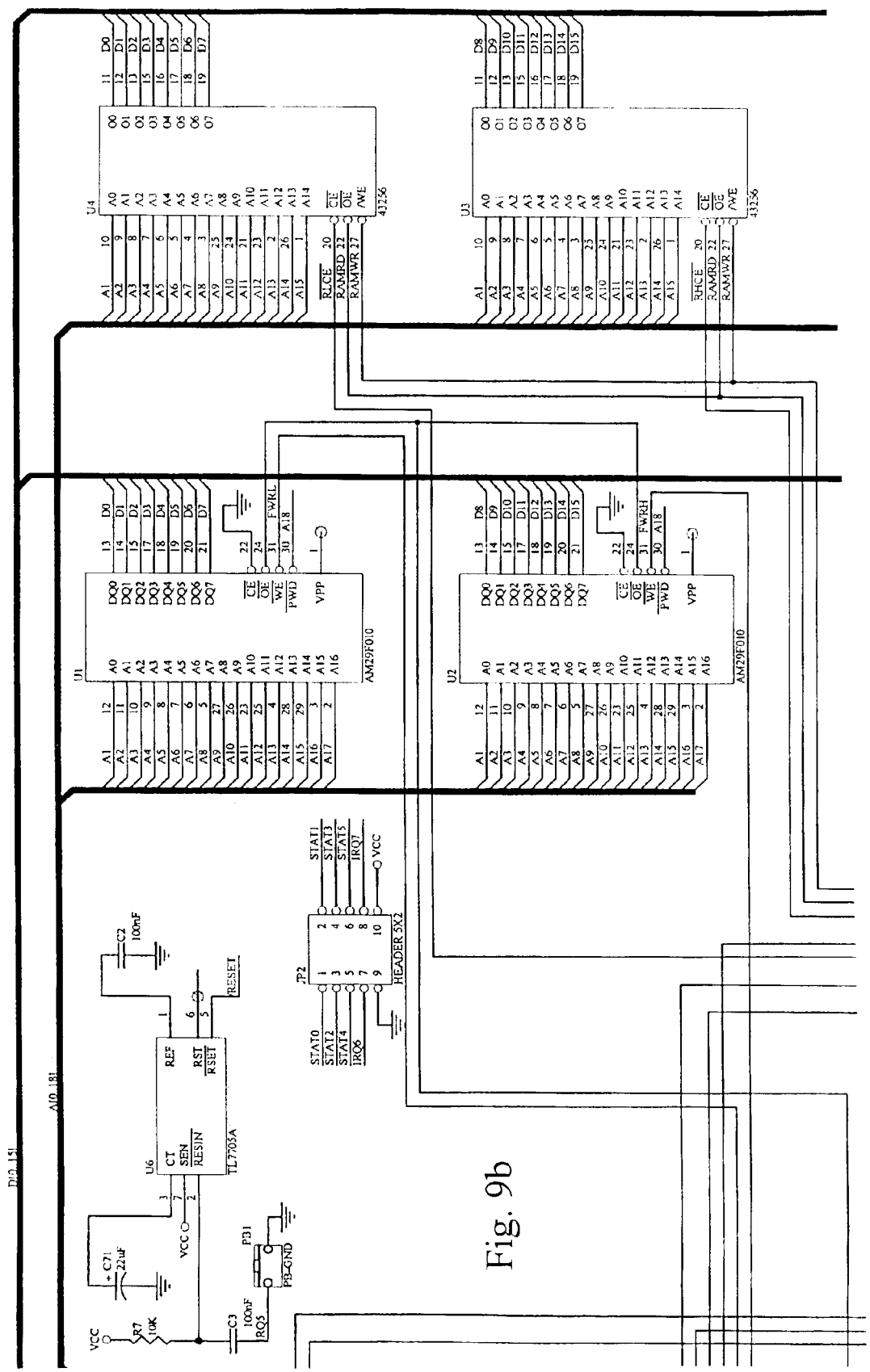
Figure 9C:
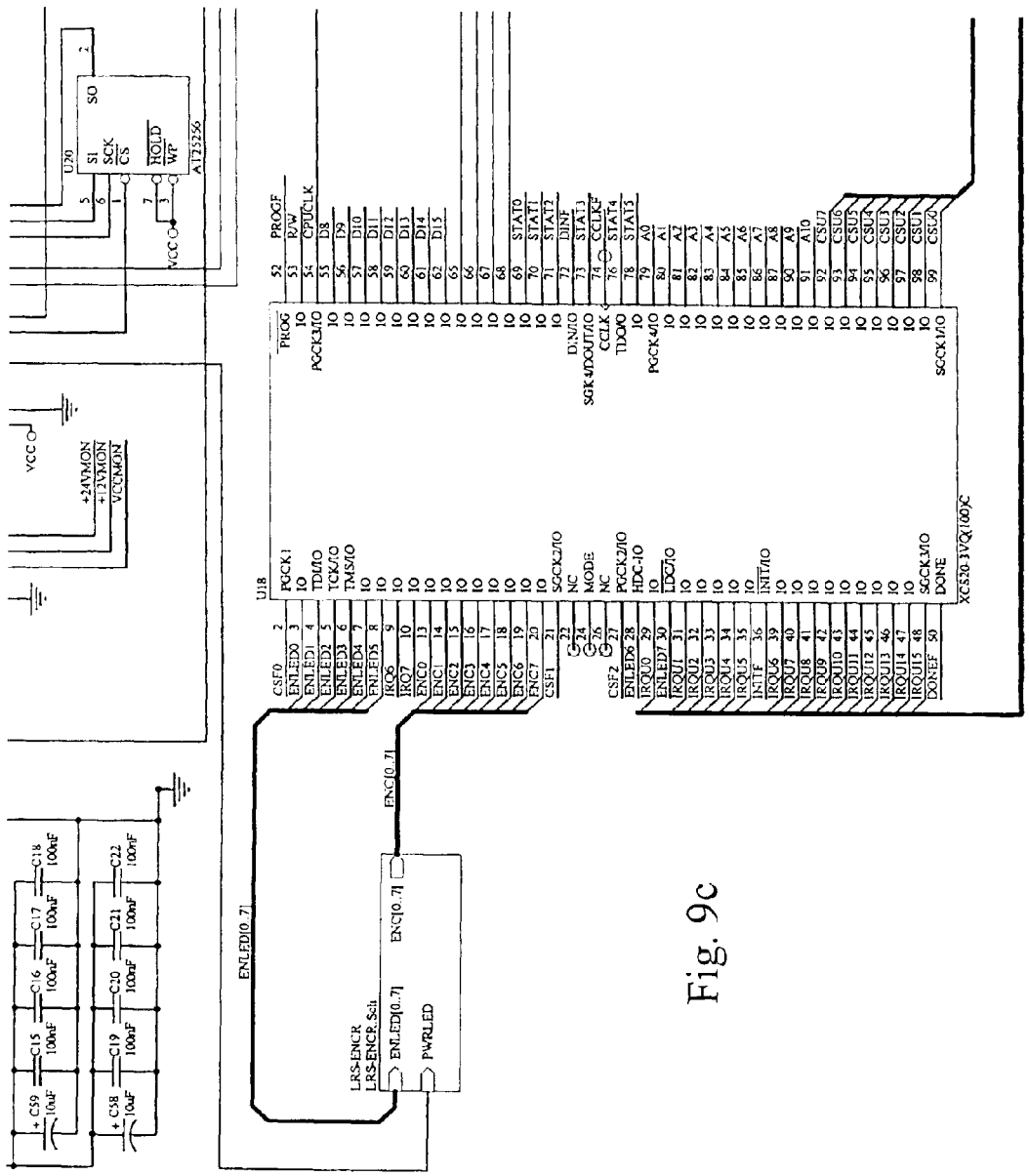
Figure 9D:
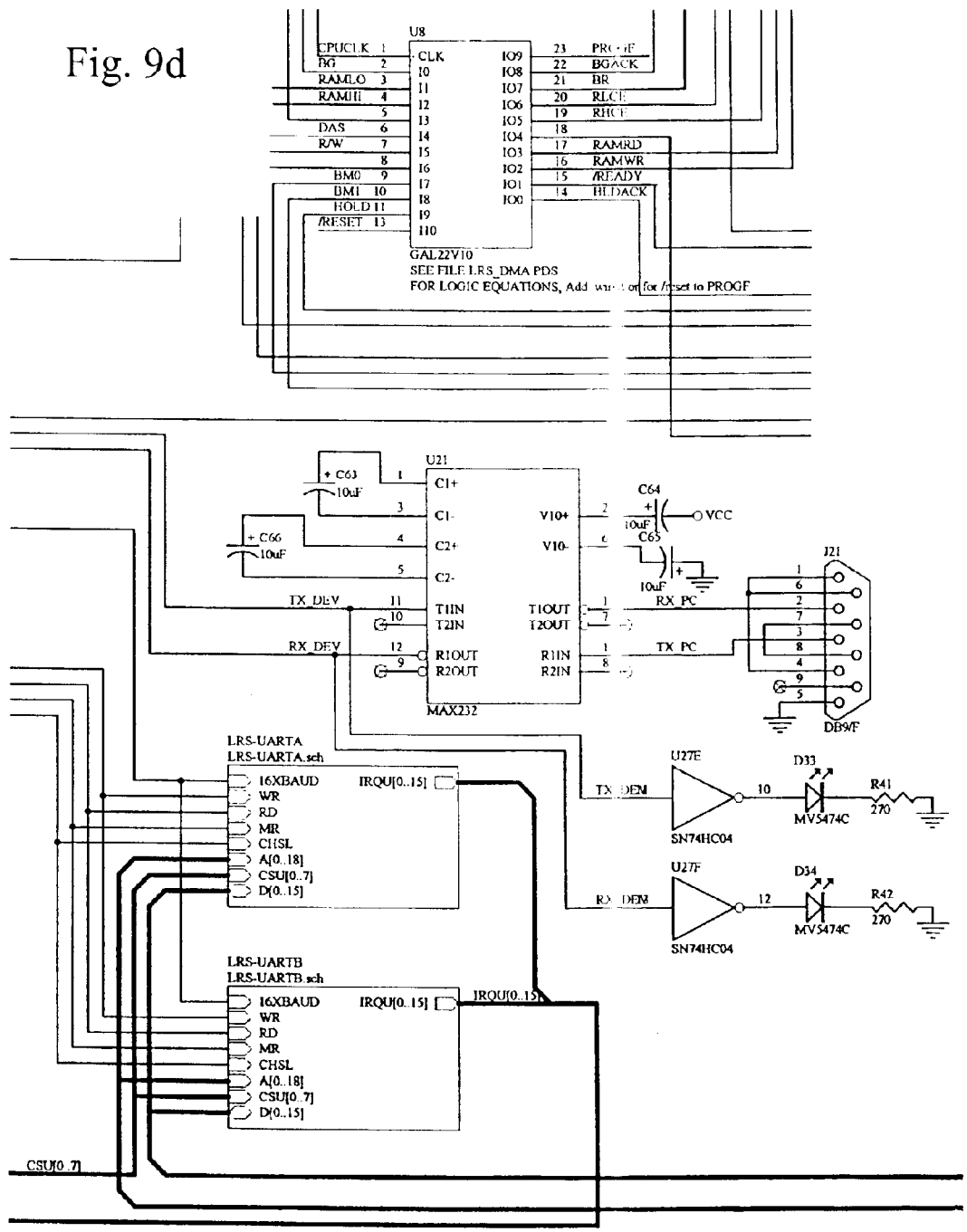
Figure 9E:
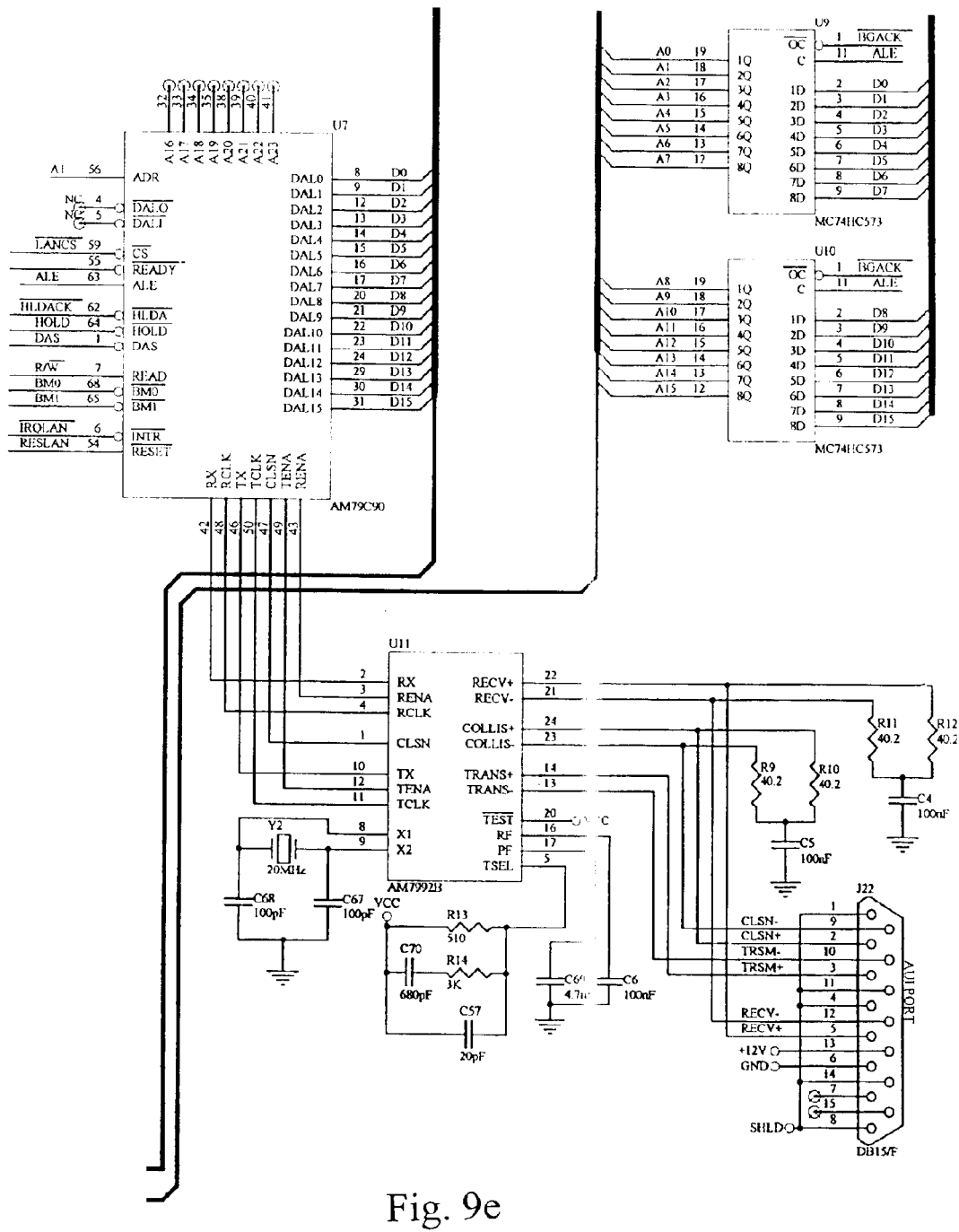

In accordance with one aspect of the present invention, there is provided a sensor concentrating system for associating parameter value data from two or more parameter sensing devices. In accordance with another aspect of the invention, there is provided a method for establishing a determinative association between at least two different sets of parameter data and utilizing such associated data in the control or monitoring of apparatus for implementing an industrial process. These two aspects of the invention are related and will be described concurrently.

Specifically, the present invention describes a device and technique for associating multiple series of parameter data, for establishing a temporal correspondence of such data with a data tag, and for packeting and routing data to an application host. These functions are performed by a sensor concentrating unit which centralizes communication for multiple parameter sensing devices.

The sensor concentrating unit is coupled to, and user operable by means of an application host; a communication link must be established between an application host and the sensor concentrating device. In the preferred embodiment of the invention, the application host is connected to, and may communicate with the sensor concentrating unit by means of an Ethernet interface running TCP/IP. In this way, the operator can transmit instructions and receive data over a Telnet session, as well as over a user defined UDP session. Alternatively, the application host may communicate with the sensor concentrating unit through an RS232 serial interface, however at limited bandwidth. In such case, the flow control may be provided by host software.

According to the preferred embodiment, the sensor concentrating unit allows up to four host computers to simultaneously interrogate a single sensor concentrating unit. Each application host is connected to the sensor concentrating unit by means of an Ethernet connection. Each request from an application host to the sensor concentrating unit initiates a UDP session; concurrently, the sensor concentrating unit can communicate with multiple host computers over multiple ongoing UDP sessions. To response to a particular request, the sensor concentrating unit obtains and packets the specified data. The sensor concentrating unit transmits the data packet to the appropriate application host identified as the transmitter of the particular request. The appropriate application host is correctly identified by the combination of a particular IP address, a particular port number, and a particular session number which are inherent properties of the TCP/IP protocol.

In addition to connecting multiple host computers to a single sensor concentrating unit, multiple sensor concentrating units may be connected together via an Ethernet network. Furthermore, a shaft encoder can be connected in parallel from one sensor concentrating unit to another. Such a configuration effectively allows more than sixteen range sensors to share the same shaft encoder position data regardless of how many sensors may be connected to a single sensor concentrating unit.

Once a communication link has been established between an application host and the sensor concentrating unit, the application host may transmit instructions to and receive data from the sensor concentrating unit. For example, via the application host, the operator of the system may be able to query the sensor concentrating unit for various performance related data. Queries may include requests for data such as the sensor concentrating unit serial number, the version number of sensor concentrating unit software, the current IP address, sensor diagnostics for one or all sensors such as supply voltage and temperature, as well as runtime information relating to time since the last power up or reset of the sensor concentrating unit. The operator may also configure various settings of the sensor concentrating unit such as the IP address.

In addition to the communication link established between the sensor concentrating unit and one or more application hosts, a communication link is also established between the sensor concentrating unit and at least two parameter sensing devices. Each parameter sensing device makes a series of discrete parameter value measurements and generates a corresponding series of parameter value data. Parameter sensing devices may also receive operating parameters from the sensor concentrating unit. According to the preferred embodiment of the invention, the sensor concentrating unit includes means for communicating with up to sixteen optical range sensors and up to two shaft encoders.

Optical Range Sensors

The following describes the operation of the optical range sensors and their role in the present invention. For each scan, a single range sensor provides data relating to the distance from the sensor to the surface of an object. An optical range sensor making a series of rapid range scans to the surface of a moving object generates a corresponding series of range data. Furthermore, multiple optical range sensors can be used simultaneously to measure range to several different locations, and at varying orientations to, the surface of an object. Every optical range sensors is connected to the sensor concentrating unit by means of a separate connection; concurrently, every optical range sensor transmits a series of range data to the sensor concentrating unit.

According to the preferred embodiment of the invention, each range sensor is connected to the sensor concentrating unit by means of a plug in terminal strip connection. Sensor concentrating unit interfaces to the range sensors exhibit plug and play abilities meaning that a range sensor may be automatically configured without worrying about setting DIP switches, jumpers, and other configuration elements. Furthermore, the interfaces exhibit the ability to add and remove parameter sensing devices to a sensor concentrating unit while the sensor concentrating unit is operating and have the system automatically recognize the change.

By means of the sensor concentrating unit, the operator may be able to obtain performance related data from, or may customize operation of the optical range sensor by providing instructions to individual sensors by means of the sensor concentrating unit.

Over the Telnet session, the operator may address a set of instructions for a particular range sensor. These instructions are transmitted to the sensor concentrating unit. The sensor concentrating unit may then forward the instruction to the particular range sensor as defined by the destination address. If the instruction includes a request for sensor performance data, the range sensor responds to the request by transmitting relevant statistical information back to the sensor concentrating unit. The sensor concentrating unit then routes the performance related data to the application host by means of a Telnet session.

Since specific operating parameters are often related to the physical location of the range sensor rather than the range sensor itself, instead of storing customized operating parameters in the memory of the optical range sensors, a set of customized operating parameters may also be stored in the non-volatile memory of the sensor concentrating unit. This permits the system to reestablish an initial configuration regardless of interruptions to sensor concentrating unit power supply and/or removal and re-connection of any sensors, given the sensors are of a compatible type. Associated with each optical range sensor interface, the operator may store specific operating parameters for any range sensor connected to the sensor concentrating unit by means of that interface. Any set of operating parameters can be transmitted to a range sensor as necessary. In this way, sensing devices may be readily interchangeable. Also, various adjustments and operating parameter updates can be centralized by the sensor concentrating unit.

For example, according to the preferred embodiment of the invention, the operator may specify a region of interest for an optical range sensor connected to a particular interface. Such region of interest data are stored by the sensor concentrating unit in a non-volatile memory. These instructions may be automatically downloaded to any given range sensor whenever one of the following four conditions is satisfied: the sensor concentrating unit is powered-up or reset, an optical range sensor is first detected by the sensor concentrating unit, the operating parameters to an optical range sensor are modified, or when an ASCII communication session with any given parameter sensor is terminated.

Specifically, the sensor concentrating unit automatically monitors the range sensor interfaces relative to one of five states. Dependent upon the state of a given sensor interface, the sensor concentrating unit automatically performs certain steps to configure a parameter sensing device connected to that interface. More particularly, the sensor concentrating unit determines any given sensor interface to be of a particular state when the one of the following five cumulative conditions have been satisfied:

1. If no response is received to a polling request, a sensor interface is designated to be state 0.
2. After a boot up message (transmitted by a sensor when it is plugged in to the sensor interface) is received by the sensor concentrating unit, a sensor interface is designated to be state 1.
3. When the sensor concentrating unit determines the type of parameter sensing device connected to a sensor interface, a sensor interface is designated to be state 2.
4. After the sensor concentrating unit downloads operating parameters to a parameter sensing device dependent both upon the particular interface to which the sensor is connected and the type of sensing device, a sensor interface is designated to be state 3.
5. After the sensor concentrating unit successfully receives parameter data in response to a binary polling request, a sensor interface is designated to be state 4.

Shaft Encoders

The second type parameter sensing device used in the present invention, a shaft encoder, will now be described. According to the preferred embodiment of the invention, up to two shaft encoders may be connected to the sensor concentrating unit. A shaft encoder monitors the position of a rotating object and transmits a series of electronically-readable position data to the sensor concentrating unit. Specifically, a shaft encoder transmits incremental rotation data relative to some fixed angular position by means of a quadrature signal; that is, two square signals: signals A and B. These signals are related but are out of phase; the rising edge of signal B either leads or lags the rising edge of signal A relative to some initial signal configuration.

Conceptually, the determination of whether a rising edge of signal B leads or lags a rising edge of signal A indicates the direction of a fixed incremental rotation of the encoder shaft. In practice, quadrature signals A and B are acquired by the sensor concentrating unit and are fed through a logic device. Various logic gates programmed in the logic device are used to produce a signal indicative of the lead or lag of the rising edge of signal B with respect to the rising edge of signal A, and hence direction of incremental rotation of the encoder shaft. The output signal indicates an incremental increase or decrease of the total rotational position of the encoder shaft relative to some initial position. Either the application host or the sensor concentrating unit retains the total rotational position of the shaft encoder. In either case, the output signal of the logic device is used to update this aggregate total as necessary. The relative rotational position is directly proportional to the relative linear position of an object placed on a moving production line.

In the preferred embodiment, cable wire is used to connect each of the sensing devices to the sensing device interfaces included in the sensor concentrating unit. However, other embodiments of the invention might substitute wireless connections or optical connections between the sensor concentrating unit and any one of the parameter sensing devices.

The Reading Session

According to the preferred embodiment of the invention, the sensor concentrating unit associates at least two different types of parameter data by making a reading. A reading is defined by taking a sampling of data from at least two different series of parameter data according to a user specified criteria. For clarity the following definitions are made: a single reading is transmitted as a single packet, a packet contains a record, a record provides multiple fields, and fields provide sensor output data. An underlying premise of this technique, therefore, is that parameter value data is produced at a rate which is faster than the sensor concentrating unit is required to produce temporally correlated data for the application host.

According to the preferred embodiment, an application host may transmit a request to the sensor concentrating unit to begin a reading session; a reading session provides a series of readings for the application host. A request to begin a reading session includes the following information:

1. the time, in sensor concentrating unit scan intervals, between each reading in the reading session;
2. the number of sensor concentrating unit scan records to be returned per packet; and
3. the maximum number of packets required for the reading session After receiving this information, the sensor concentrating unit may then begin a reading session by sampling parameter data according to a user specified criteria. The user specified criteria is an algorithm or a set of instructions, which direct the sensor concentrating unit to sample data records from certain series of data records produced by the sensor concentrating unit.

For example, according to the preferred embodiment, the sensor concentrating unit samples data from the series of sensing devices according to a time division multiplexing technique. During a reading, the sensor concentrating unit acquires at least one sample of data from each sensing device data stream. Specifically, each reading period is divided into a number of equal sub-intervals. The number of sub-periods should be greater than the total number of series of parameter data received by the sensor concentrating unit. At the beginning of each sub-period of time, the sensor concentrating unit acquires a sample of data from a different data stream until data from each series of parameter data has been acquired. In this way, every reading consists of both parameter value data acquired from every range sensor connected to the sensor concentrating unit and position data acquired from every shaft encoder connected to the sensor concentrating unit. It is possible there may be more sub-periods than data streams in which case there may be a few sub periods in which the sensor concentrating unit does not acquire any data.

The above time division multiplexing technique for sampling parameter value data represents just one technique for acquiring data from multiple series of data. Essentially, the user specified criterion is simply a set of instructions which direct the sensor concentrating unit to sample parameter value data from certain series of parameter value data at particular times. Furthermore, since one subset of sensing devices connected to the sensor concentrating unit may provide data relating to one aspect of the industrial process, while another subset of sensing devices provide data relating to another aspect of the industrial process, the application host may use separate criteria for associating data from two distinct sub-systems.

Parameter data and position data associated during a reading are next correlated with a data tag. A data tag is used as a reference for the operator to help identify data received from the sensor concentrating unit. A data tag is automatically generated by the sensor concentrating unit and may be related to the clock-time, the reading number, the reading session number, or some other quantity defined according to the needs of the operator.

Each reading, consisting of parameter data sampled from optical range sensors, position data acquired from shaft encoders and the user specified data tag is next packeted by the sensor concentrating unit according to previously known TCP/IP protocols and routed to the application host.

According to the preferred embodiment of the invention, the results from each reading displayed or acquired by the application host include the following data:

1. a data tag;
2. one or more counter data samples from each of the shaft encoders;
3. one or more range data samples from each of the optical range sensors.

Other Embodiments

The present invention is not restricted to the preferred embodiment described above. For example, depending upon the specific industrial process, the operator of the sensor concentrating unit may establish other criteria for selecting a sampling from the parameter and position data streams within a given time interval. The time division multiplexing technique can readily be substituted by another determinative criteria.

Furthermore, other types of parameter sensing devices can be substituted for range sensing devices to measure parameters such as temperature, weight, reflectivity or the like. Such data may provide indication of product quality or quantity, or measurement of system performance. Additionally, the data may be incorporated in a feedback loop to obtain a desired outcome. Similarly, other position data may be acquired from systems such as a Global Positioning device and can be readily substituted for a shaft encoder.

Furthermore, the physical connection between the application host and the sensor concentrating system could be replaced by a wireless connection by using a wireless communication system. Such a portable system could by used to transmit accurate temporally corresponding position and parameter data back to an application host operated from a fixed location when exploring terrain by remote devices.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A sensor concentrating system for associating parameter value data from multiple series of parameter value data and for routing selected parameter data to a selected process control device downstream of the sensor concentrating system, the process control device acting in response to the routed data, said system comprising:

at least two parameter sensing devices, each parameter sensing device making a series of discrete parameter value measurements and generating a corresponding series of parameter value data;

means for receiving the series of parameter value data from the sensing devices representing the series of discrete parameter value measurements;

means for reading the series of parameter value data from the sensing devices;

discrimination means to separate parameter value data representing a parameter value measurement at one time or in one position or both from other parameter value data;

sampling means to read a selected set of parameter value data from each series of discrete parameter value data according to specified criteria;

processing means for associating selected sets of parameter value data from the parameter sensing devices and for generating a data tag representing at least one selected characteristic of the associated data; and routing means for directing selected data to the downstream process control device.

2. A sensor concentrating system as defined in claim 1, wherein the parameter data consist of one of the following: position data, time data, range data, temperature data, reflectivity data, and mass data.

3. A sensor concentrating system as defined in claim 1, wherein the processing means includes a microprocessor, and a data storage means.

4. A sensor concentrating system as defined in claim 1, wherein the routing means directs the selected data to the downstream process control device via a telecommunications network.

5. A method for establishing a determinative association between at least two different sets of parameter data and utilizing such associated data in the control of apparatus for implementing an industrial process, comprising the steps of:

receiving at least two different series of parameter data, each series of parameter data consisting of discrete parameter value data;

sampling a selected set of parameter value data from each of the series of parameter data according to at least one specified criterion;

associating each of a selected set of parameter value data with a corresponding selected set of parameter value data, thereby to generate a combined parameter data packet representing the combined at least two selected sets of parameter value data;

generating a data tag indicative of a characteristic of the sampled data and appending it to the data packet; and routing selected tagged data packets to selected destinations in response to operator-selected instructions.

6. A method according to claim 5, wherein the parameter data consist of at least one of the following: position data, time data, range data, temperature data, reflectivity data, and mass data.

7. A method according to claim 5, wherein the at least one specified criterion is based upon time division multiplexing.

* * * * *